(12) United States Patent
Qin et al.

(10) Patent No.: US 9,274,758 B1
(45) Date of Patent: Mar. 1, 2016

(54) SYSTEM AND METHOD FOR CREATING CUSTOMIZED PERFORMANCE-MONITORING APPLICATIONS

(71) Applicant: Dell Software Inc., Aliso Viejo, CA (US)

(72) Inventors: Yinghua Qin, Zhuhai (CN); Xiaojia Cai, Guangzhou (CN); Xilang Yan, Zhuhai (CN); Shengzhi Liu, Zhuhai (CN); Peisen Lin, Shenzhen (CN); Geoffrey Vona, Toronto (CA)

(73) Assignee: Dell Software Inc., Aliso Viejo, CA (US)

( * ) Notice: Subject to any disclaimer, the term of this patent is extended or adjusted under 35 U.S.C. 154(b) by 0 days.

(21) Appl. No.: 14/607,776

(22) Filed: Jan. 28, 2015

(51) Int. Cl.
*G06F 9/44* (2006.01)
*H04L 29/08* (2006.01)
*G06F 9/445* (2006.01)
*G06F 11/34* (2006.01)

(52) U.S. Cl.
CPC .. *G06F 8/30* (2013.01); *G06F 8/60* (2013.01); *G06F 11/3466* (2013.01); *H04L 67/10* (2013.01)

(58) Field of Classification Search
CPC .............................. G06F 8/30; G06F 11/3466
USPC .................................................. 717/106, 127
See application file for complete search history.

(56) References Cited

U.S. PATENT DOCUMENTS

| | | |
|---|---|---|
| 3,701,971 A | 10/1972 | Sanner et al. |
| 3,839,707 A | 10/1974 | Woodward et al. |
| 4,468,728 A | 8/1984 | Wang |
| 4,683,532 A | 7/1987 | Yount et al. |
| 4,937,740 A | 6/1990 | Agarwal et al. |
| 5,103,394 A | 4/1992 | Blasciak |

(Continued)

FOREIGN PATENT DOCUMENTS

WO  WO-2013162596 A1  10/2013

OTHER PUBLICATIONS

Template Software, Workflow Template Process Template, "Developing a WFT Workflow System", 1997, whole manual.

(Continued)

*Primary Examiner* — Phillip H Nguyen
(74) *Attorney, Agent, or Firm* — Winstead PC

(57) ABSTRACT

In one embodiment, a method is performed by a computer system. The method includes providing a performance-monitoring platform as a service, the performance-monitoring platform comprising at least one agent manager. The method further includes facilitating creation of a customized performance-monitoring application, the performance-monitoring application comprising an agent and at least one user dashboard. The agent is configured to collect performance data related to a specified monitored resource. The agent parses the collected performance data to a monitoring server for storage according to at least one standard data model. The at least one user dashboard allows users to view information related to the collected performance data. The facilitating includes configuring deployment attributes of the customized performance-monitoring application responsive to developer input. Moreover, the method includes deploying the customized performance-monitoring application on the performance-monitoring platform. The method also includes making the customized performance-monitoring application available to end users as a service.

20 Claims, 5 Drawing Sheets

(56) References Cited

U.S. PATENT DOCUMENTS

| | | |
|---|---|---|
| 5,321,838 A | 6/1994 | Hensley et al. |
| 5,375,199 A | 12/1994 | Harrow et al. |
| 5,432,932 A | 7/1995 | Chen et al. |
| 5,450,586 A | 9/1995 | Kuzara et al. |
| 5,493,658 A | 2/1996 | Chiang et al. |
| 5,506,955 A | 4/1996 | Chen et al. |
| 5,517,629 A | 5/1996 | Boland |
| 5,528,753 A | 6/1996 | Fortin |
| 5,539,907 A | 7/1996 | Srivastava et al. |
| 5,572,640 A | 11/1996 | Schettler |
| 5,600,789 A | 2/1997 | Parker et al. |
| 5,623,598 A | 4/1997 | Voigt et al. |
| 5,649,187 A | 7/1997 | Hornbuckle |
| 5,671,351 A | 9/1997 | Wild et al. |
| 5,673,386 A | 9/1997 | Batra |
| 5,684,945 A | 11/1997 | Chen et al. |
| 5,701,137 A | 12/1997 | Kiernan et al. |
| 5,708,775 A | 1/1998 | Nakamura |
| 5,715,388 A | 2/1998 | Tsuchihashi |
| 5,715,415 A | 2/1998 | Dazey et al. |
| 5,720,018 A | 2/1998 | Muller et al. |
| 5,740,357 A | 4/1998 | Gardiner et al. |
| 5,748,881 A | 5/1998 | Lewis et al. |
| 5,752,062 A | 5/1998 | Gover et al. |
| 5,768,501 A | 6/1998 | Lewis |
| 5,872,909 A | 2/1999 | Wilner et al. |
| 5,881,306 A | 3/1999 | Levine et al. |
| 5,903,453 A | 5/1999 | Stoddard, II |
| 5,903,898 A | 5/1999 | Cohen et al. |
| 5,911,048 A | 6/1999 | Graf |
| 5,960,425 A | 9/1999 | Buneman et al. |
| 5,978,594 A | 11/1999 | Bonnell et al. |
| 5,983,366 A | 11/1999 | King |
| 6,018,567 A | 1/2000 | Dulman |
| 6,029,170 A | 2/2000 | Garger et al. |
| 6,035,412 A | 3/2000 | Tamer et al. |
| 6,128,016 A | 10/2000 | Coelho et al. |
| 6,148,335 A | 11/2000 | Haggard et al. |
| 6,173,322 B1 | 1/2001 | Hu |
| 6,195,092 B1 | 2/2001 | Dhond et al. |
| 6,199,199 B1 | 3/2001 | Johnston et al. |
| 6,223,171 B1 | 4/2001 | Chaudhuri et al. |
| 6,243,105 B1 | 6/2001 | Hoyer et al. |
| 6,330,008 B1 | 12/2001 | Razdow et al. |
| 6,351,754 B1 | 2/2002 | Bridge, Jr. et al. |
| 6,473,791 B1 | 10/2002 | Al-Ghosein et al. |
| 6,538,669 B1 | 3/2003 | Lagueux, Jr. et al. |
| 6,543,006 B1 | 4/2003 | Zundel et al. |
| 6,594,655 B2 | 7/2003 | Tal et al. |
| 6,622,221 B1 | 9/2003 | Zahavi |
| RE38,270 E | 10/2003 | Nakajima |
| 6,654,830 B1 | 11/2003 | Taylor et al. |
| 6,751,555 B2 | 6/2004 | Poedjono |
| 6,771,646 B1 | 8/2004 | Sarkissian et al. |
| 6,833,787 B1 * | 12/2004 | Levi .................... 340/539.13 |
| 6,847,970 B2 | 1/2005 | Keller et al. |
| 6,901,582 B1 | 5/2005 | Harrison |
| 6,993,454 B1 | 1/2006 | Murstein et al. |
| 7,103,843 B2 | 9/2006 | Hand et al. |
| 7,127,324 B2 | 10/2006 | Batori et al. |
| 7,274,375 B1 | 9/2007 | David |
| 7,363,211 B1 | 4/2008 | Naganathan et al. |
| 7,389,345 B1 | 6/2008 | Adams |
| 7,480,647 B1 | 1/2009 | Murstein et al. |
| 7,480,866 B2 | 1/2009 | Germain et al. |
| 7,483,978 B2 | 1/2009 | Esfahany et al. |
| 7,512,888 B2 | 3/2009 | Sugino et al. |
| 7,523,128 B1 | 4/2009 | Miller et al. |
| 7,532,642 B1 | 5/2009 | Peacock |
| 7,557,803 B2 | 7/2009 | Furukawa et al. |
| 7,565,610 B2 | 7/2009 | Li et al. |
| 7,587,492 B2 | 9/2009 | Dyck et al. |
| 7,620,984 B2 | 11/2009 | Kallahalla et al. |
| 7,644,397 B2 | 1/2010 | Warren et al. |
| 7,685,251 B2 | 3/2010 | Houlihan et al. |
| 7,784,027 B2 | 8/2010 | Harrison |
| 7,792,941 B2 | 9/2010 | Fried et al. |
| 7,882,216 B2 | 2/2011 | Houlihan et al. |
| 7,917,617 B1 | 3/2011 | Ponnapur et al. |
| 7,962,590 B1 | 6/2011 | Or et al. |
| 7,979,245 B1 | 7/2011 | Bourlatchkov et al. |
| 8,051,162 B2 | 11/2011 | Arlitt et al. |
| 8,051,330 B2 | 11/2011 | Cinato et al. |
| 8,051,382 B1 | 11/2011 | Kingdom et al. |
| 8,103,638 B2 | 1/2012 | Voznika et al. |
| 8,103,826 B2 | 1/2012 | Kobayashi |
| 8,112,366 B2 | 2/2012 | Hollingsworth et al. |
| 8,155,996 B1 | 4/2012 | Cassone et al. |
| 8,175,862 B1 | 5/2012 | Bourlatchkov et al. |
| 8,175,863 B1 | 5/2012 | Ostermeyer et al. |
| 8,181,154 B2 | 5/2012 | Harrison |
| 8,185,598 B1 | 5/2012 | Golovin et al. |
| 8,203,972 B2 | 6/2012 | Sauermann |
| 8,217,945 B1 | 7/2012 | Moscovici |
| 8,239,526 B2 | 8/2012 | Simpson et al. |
| 8,255,516 B1 | 8/2012 | Zhang et al. |
| 8,347,273 B2 | 1/2013 | Nageshappa et al. |
| 8,364,460 B2 | 1/2013 | Ostermeyer et al. |
| 8,423,646 B2 | 4/2013 | Jamjoom et al. |
| 8,490,055 B2 | 7/2013 | Basak |
| 8,555,244 B2 | 10/2013 | Harrison |
| 8,635,498 B2 | 1/2014 | Kahana et al. |
| 8,819,673 B1 | 8/2014 | Wilkinson et al. |
| 8,880,678 B1 * | 11/2014 | Colton et al. .................. 709/224 |
| 8,892,415 B2 | 11/2014 | Bourlatchkov et al. |
| 8,930,395 B2 | 1/2015 | Sharma et al. |
| 2001/0018710 A1 | 8/2001 | Clarke et al. |
| 2002/0138659 A1 * | 9/2002 | Trabaris et al. ............... 709/313 |
| 2002/0175941 A1 | 11/2002 | Hand et al. |
| 2003/0009551 A1 | 1/2003 | Benfield et al. |
| 2003/0028630 A1 | 2/2003 | Bischof et al. |
| 2003/0084155 A1 | 5/2003 | Graupner et al. |
| 2003/0097438 A1 | 5/2003 | Bearden et al. |
| 2003/0101262 A1 | 5/2003 | Godwin |
| 2003/0126256 A1 | 7/2003 | Cruickshank et al. |
| 2003/0149753 A1 | 8/2003 | Lamb |
| 2003/0204588 A1 | 10/2003 | Peebles et al. |
| 2003/0225563 A1 | 12/2003 | Gonos |
| 2004/0006763 A1 | 1/2004 | Van De Vanter et al. |
| 2004/0012637 A1 | 1/2004 | Alford et al. |
| 2004/0030592 A1 | 2/2004 | Buck et al. |
| 2004/0039728 A1 | 2/2004 | Fenlon et al. |
| 2004/0046785 A1 | 3/2004 | Keller |
| 2004/0059812 A1 | 3/2004 | Assa |
| 2004/0064293 A1 | 4/2004 | Hamilton et al. |
| 2004/0102925 A1 | 5/2004 | Giffords |
| 2005/0021743 A1 | 1/2005 | Fleig et al. |
| 2005/0021748 A1 | 1/2005 | Garcea et al. |
| 2005/0111352 A1 | 5/2005 | Ho et al. |
| 2005/0198649 A1 | 9/2005 | Zakonov |
| 2006/0101340 A1 | 5/2006 | Sridhar et al. |
| 2006/0168199 A1 * | 7/2006 | Chagoly et al. ............... 709/224 |
| 2006/0171334 A1 | 8/2006 | Hirata et al. |
| 2006/0173875 A1 | 8/2006 | Stefaniak |
| 2007/0028239 A1 | 2/2007 | Dyck et al. |
| 2007/0043860 A1 | 2/2007 | Pabari |
| 2007/0226341 A1 | 9/2007 | Mateo |
| 2007/0255814 A1 | 11/2007 | Green et al. |
| 2008/0016115 A1 | 1/2008 | Bahl et al. |
| 2008/0077366 A1 | 3/2008 | Neuse et al. |
| 2008/0155537 A1 | 6/2008 | Dinda et al. |
| 2008/0222633 A1 | 9/2008 | Kami |
| 2008/0320269 A1 | 12/2008 | Houlihan et al. |
| 2009/0013281 A1 | 1/2009 | Helfman et al. |
| 2009/0150538 A1 | 6/2009 | Tripathi et al. |
| 2009/0164250 A1 | 6/2009 | Hamilton et al. |
| 2009/0172666 A1 | 7/2009 | Yahalom et al. |
| 2009/0177567 A1 * | 7/2009 | McKerlich et al. ............. 705/35 |
| 2009/0199177 A1 | 8/2009 | Edwards et al. |
| 2009/0204718 A1 | 8/2009 | Lawton et al. |
| 2009/0210527 A1 | 8/2009 | Kawato |
| 2009/0222558 A1 | 9/2009 | Xu et al. |
| 2009/0241108 A1 | 9/2009 | Edwards et al. |
| 2009/0271646 A1 | 10/2009 | Talwar et al. |

(56) References Cited

U.S. PATENT DOCUMENTS

| | | |
|---|---|---|
| 2009/0300605 A1 | 12/2009 | Edwards et al. |
| 2010/0114554 A1 | 5/2010 | Misra |
| 2010/0125665 A1 | 5/2010 | Simpson et al. |
| 2010/0223609 A1 | 9/2010 | DeHaan et al. |
| 2010/0229096 A1 | 9/2010 | Maiocco et al. |
| 2010/0241690 A1 | 9/2010 | Kurapati et al. |
| 2010/0325273 A1 | 12/2010 | Kudo |
| 2011/0047496 A1 | 2/2011 | Harrison |
| 2011/0119748 A1 | 5/2011 | Edwards et al. |
| 2011/0145380 A1 | 6/2011 | Glikson et al. |
| 2011/0153724 A1 | 6/2011 | Raja et al. |
| 2011/0161851 A1 | 6/2011 | Barber et al. |
| 2011/0209146 A1 | 8/2011 | Box et al. |
| 2011/0254704 A1 | 10/2011 | Fournier et al. |
| 2011/0302577 A1 | 12/2011 | Reuther et al. |
| 2012/0011254 A1 | 1/2012 | Jamjoom et al. |
| 2012/0023429 A1 | 1/2012 | Medhi |
| 2012/0030346 A1 | 2/2012 | Fukuda et al. |
| 2012/0166623 A1 | 6/2012 | Suit |
| 2012/0221314 A1 | 8/2012 | Bourlatchkov et al. |
| 2012/0222002 A1 | 8/2012 | Harrison |
| 2012/0254900 A1 | 10/2012 | Kumar et al. |
| 2012/0284713 A1 | 11/2012 | Ostermeyer et al. |
| 2013/0159999 A1 | 6/2013 | Chiueh et al. |
| 2013/0174127 A1 | 7/2013 | Chen et al. |
| 2013/0218547 A1 | 8/2013 | Ostermeyer et al. |
| 2014/0006580 A1 | 1/2014 | Raghu |
| 2014/0013315 A1 | 1/2014 | Genevski et al. |
| 2014/0089901 A1* | 3/2014 | Hadar ............................ 717/127 |
| 2014/0115164 A1 | 4/2014 | Kalyanaraman et al. |
| 2014/0165063 A1 | 6/2014 | Shiva et al. |
| 2014/0317261 A1 | 10/2014 | Shatzkamer et al. |
| 2014/0317293 A1 | 10/2014 | Shatzkamer |

OTHER PUBLICATIONS

Partridge C. et al. Fire State Message Protocol Specification, BBN Technologies, Jul. 12, 2000, (pp. 1-19).
NEWRELICBLOG, "Platform as a Service Meets SaaS Application Performance Management"; http://blog.newrelic.com/2011/01/13/platform-as-a-service-meets-saas-application-performance-management/; Jan. 13, 2011; 3 pages.
Quest Software, Inc.; "Instance Monitor"; Brochure, Quest Software, Inc.; 1999; 2 pages.
Boucher, Karen et al.; "Essential Guide to Object Monitors"; Mar. 1999; 263 pages (whole book).
Dewan, Prasun et al.; "A High-Level and Flexible Framework for Implementing Multiuser User Interfaces"; 1992; pp. 345-380.
Distributed Management Task Force, Inc. (DMTF); "Common Information Model (CIM) Infrastructure Specification"; Version 2.3 Final; Oct. 4, 2005; 102 pages.
Harrison, Guy; "Oracle SQL High-Performance Tuning"; ("Building a High-Performance Oracle Database Server" and "Tuning the Database Server"); Prentice-Hall, NJ; 1997; pp. 363-364 and 399-400.
Hitachi, Ltd et al.; "Hitachi TPBroker Users Guide: Release 3.1"; Sep. 28, 1998; 311 pages (entire manual).
Laessig, Dirk; "Score Big with JSR 77, the J2EE Management Specification"; Javaworld; Jun. 14, 2002; 8 pages.
Muller, Nathan J.; "Focus on HP OpenView: A Guide to Hewlett-Packard's Network and Systems Management Platform"; CBM Books; 1995; 304 pages (entire book).
Savant Corporation; "Products"; http://www.savant-corp.com/prods.html, downloaded on Nov. 16, 1999; 1 page.
Savant Corporation; "Products"; http://www.savant-corp.com/prods.html, downloaded on Feb. 15, 2000; 1 page.
Savant Corporation; "Q Application Diagnostics"; http://www.savant-corp.com/qappd.html, downloaded on Nov. 16, 1999; 1 page.
Savant Corporation; "Q Hot SQL"; http://www.savant-corp.com/qhsql.html, downloaded on Nov. 16, 1999; 1 page.
Savant Corporation; "Q Instance Overview"; http://www.savant-corp.com/qiov.html, downloaded on Nov. 16, 1999; 1 page.
Savant Corporation; "Q Job Queue Manager"; http://www.savant-corp.com/qjobq.html, downloaded on Nov. 16, 1999; 1 page.
Savant Corporation; "Q Lock Manager"; http://www.savant-corp.com/qlock.html, downloaded on Nov. 16, 1999; 1 page.
Savant Corporation; "Q Replay Viewer"; http://www.savant-corp.com/qreplay.html, downloaded on Nov. 16, 1999; 1 page.
Singh, Inderjeet et al.; "Designing Web Services with J2EE 1.4 Platform JAX-RPC, SOAP, and XML Technologies"; Chapter 6 (pp. 247-289); May 2004; 46 pages.
Tang, Steven H. et al.; "Blending Structured Graphics and Layout"; ACM; Nov. 1994; pp. 167-174.
U.S. Appl. No. 13/658,709, Wang et al.
U.S. Appl. No. 13/658,724, Wang et al.
U.S. Appl. No. 14/725,778, Chen et al.
U.S. Appl. No. 14/607,776, Qin et al.
U.S. Appl. No. 14/607,907, Qin et al.
Wikimedia Foundation, Inc.; "Network Functions Virtualization"; http://en.wikipedia.org/wiki/Network_Functions_Virtualization; last modified Mar. 17, 2015; 6 pages.
NEO4J; "Network Dependency Graph"; http://www.neo4j.org/graphgist?github-neo4J . . . ; Jun. 18, 2014; 9 pages.
BMC Software, Inc.; "BMC Atrium Discovery and Dependency Mapping"; http://documents.bmc.com/products/documents/18/60/451860/451860.pdf ; 2014; 2 pages.
Microsoft; "Microsoft System Center Advisor"; http://www.systemcenteradvisor.com/; accessed on Apr. 4, 2011; 2 pages.
BMC Software, Inc.; "BMC Atrium Discovery and Dependency Mapping"; http://documents.bmc.com/products/documents/18/60/451860/451860.pdf; 2014; 2 pages.
Grisby, Duncan; "The Power behind BMC Atrium Discovery and Dependency Mapping"; http://documents.bmc.com/products/documents/18/97/451897/451897.pdf; 2014; 5 pages.
Hewlett-Packard Development Company, L.P.; "Data Sheet: HP Universal Discovery Software"; http://h20195.www2.hp.com/V2/GetPDF.aspx/4AA4-1812ENW.pdf; Sep. 2014; 8 pages.
Quest Software, Inc.; "Foglight 5.6.4: Managing Dependency Mapping User Guide"; 2012; 62 pages.
Quest Software, Inc.; "Foglight 5.6.2: Managing the Dependency Mapping User Guide"; 2011; 55 pages.
Quest Software, Inc.; "Foglight APM: An Adaptive Architecture for All Environments"; 2011; 25 pages.
vFoglight Alarms: Overview—Demo 6; 2009; 31 pages.
Quest Software, Inc.; "Foglight 5.5.8: Managing Dependency Mapping User Guide"; 2011; 53 pages.
Cappelli, Will; "APM Needs Three-Layered Application Materials"; Gartner Research; Feb. 26, 2010; 5 pages.
Microsoft; "What is System Center Advisor?"; http://onlinehelp.microsoft.com/en-us/advisor/ff962512(printer).aspx; accessed on Apr. 5, 2011; 2 pages.
Microsoft; "Microsoft System Center Advisor"; https://www.systemcenteradvisor.com/; accessed on Apr. 4, 2011; 1 page.
Microsoft; "Windows Management Instrumentation (WMI): Frequently Asked Questions: Troubleshooting and Tips"; http://technet.microsoft.com/en-us/library/ee692772(d=printer).aspx; Microsoft TechNet; Jul. 28, 2004; 20 pages.
Maston, Michael; "Managing Windows with WMI"; http://technet.microsoft.com/en-us/library/bb742445(d=printer).aspx; Nov. 1, 1999; 11 pages.
U.S. Appl. No. 14/562,474, Rustad et al.
U.S. Appl. No. 14/249,147, Rustad et al.
U.S. Appl. No. 14/292,135, Rustad.
U.S. Appl. No. 14/619,897, Diep et al.
U.S. Appl. No. 14/858,341, Qin et al.
Layered Technologies, Inc., "Optimized Application Performance and User Experience: Application Performance Management Service," 2013, 4 pages.
Levey, Tom, "Monitoring the Real End User Experience," www.appdynamics.com, Jul. 25, 2013, 7 pages.
Quarles, John et al.; "A Mixed Reality Approach for Merging Abstract and Concrete Knowledge"; IEEE Virtual Reality 2008; Mar. 8-12, 2008; pp. 27-34.

(56) References Cited

OTHER PUBLICATIONS

Aternity, Inc., "Aternity Virtual Desktop Monitoring: Get Visibility into all Tiers of the Virtual Desktop," http://www.aternity.com/products/workforce-apm/virtual-desktop-monitoring/, May 11, 2014, 2 pages.
Solarwinds Worldwide. LLC., "SolarWinds: Virtualization Manager Administrator Guide," DocVersion 6.3.0.1, Sep. 8, 2015, 321 pages.
EG Innovations, Inc., "eG Enterprise Performance Monitoring for Citrix XenDesktop: Performance Assurance for Citrix Virtual Desktops," www.eginnovations.com, accessed on Sep. 17, 2015, 2 pages.
EG Innovations, Inc., "Service Overview: VDI Performance Assessment: Move VDI Deployments from Test to Best," www.eginnovations.com, accessed on Sep. 17, 2015, 2 pages.
EG Innovations, Inc., "Total Performance Monitoring for Citrix XenApp and XenDesktop," www.eginnovations.com, accessed on Sep. 17, 2015, 2 pages.
Goliath Technologies, "Goliath Performance Monitor: for Citrix XenApp & XenDesktop," http://goliathtechnologies.com, May 2014, 2 pages.
Goliath Technologies, "Goliath Performance Monitor: for VMware," http://goliathtechnologies.com, May 2014, 2 pages.
VMTURBO, "VDI Control Module," http://vmturbo.com, Nov. 2014, 2 pages.
VMTURBO, "VMTurbo Operations Manager: Demand-Driven Control for Cloud and Virtualization," http://vmturbo.com, Jun. 2015, 2 pages.

* cited by examiner

SYSTEM AND METHOD FOR CREATING CUSTOMIZED PERFORMANCE-MONITORING APPLICATIONS

BACKGROUND

1. Technical Field

The present disclosure relates generally to application development and more particularly, but not by way of limitation, to systems and methods for creating performance-monitoring applications.

2. History of Related Art

Today, more and more business application are being deployed to cloud-computing platforms. At present, however, performance-monitoring applications can be time-consuming to develop and difficult to customize. Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system. The method includes providing a performance-monitoring platform as a service, the performance-monitoring platform comprising at least one agent manager. The at least one agent manager includes a runtime container environment for agents and provides customizable performance-monitoring functionality via at least one interface. The method further includes facilitating creation of a customized performance-monitoring application, the facilitating comprising interaction with at least one developer, the performance-monitoring application comprising an agent and at least one user dashboard. The agent is configured to collect performance data related to a specified monitored resource via the performance-monitoring functionality of the at least one agent manager. Via the performance-monitoring functionality of the at least one agent manager, the agent parses the collected performance data to a monitoring server for storage according to at least one standard data model implemented by the performance-monitoring platform. The at least one user dashboard allows users to view information related to the collected performance data. The facilitating includes configuring deployment attributes of the customized performance-monitoring application responsive to developer input. Moreover, the method includes deploying the customized performance-monitoring application on the performance-monitoring platform. The method also includes making the customized performance-monitoring application available to end users as a service.

In one embodiment, an information handling system includes at least one processor, wherein the at least one processor is operable to implement a method. The method includes providing a performance-monitoring platform as a service, the performance-monitoring platform comprising at least one agent manager. The at least one agent manager includes a runtime container environment for agents and provides customizable performance-monitoring functionality via at least one interface. The method further includes facilitating creation of a customized performance-monitoring application, the facilitating comprising interaction with at least one developer, the performance-monitoring application comprising an agent and at least one user dashboard. The agent is configured to collect performance data related to a specified monitored resource via the performance-monitoring functionality of the at least one agent manager. Via the performance-monitoring functionality of the at least one agent manager, the agent parses the collected performance data to a monitoring server for storage according to at least one standard data model implemented by the performance-monitoring platform. The at least one user dashboard allows users to view information related to the collected performance data. The facilitating includes configuring deployment attributes of the customized performance-monitoring application responsive to developer input. Moreover, the method includes deploying the customized performance-monitoring application on the performance-monitoring platform. The method also includes making the customized performance-monitoring application available to end users as a service.

In one embodiment, a computer-program product includes a non-transitory computer-usable medium having computer-readable program code embodied therein. The computer-readable program code is adapted to be executed to implement a method. The method includes providing a performance-monitoring platform as a service, the performance-monitoring platform comprising at least one agent manager. The at least one agent manager includes a runtime container environment for agents and provides customizable performance-monitoring functionality via at least one interface. The method further includes facilitating creation of a customized performance-monitoring application, the facilitating comprising interaction with at least one developer, the performance-monitoring application comprising an agent and at least one user dashboard. The agent is configured to collect performance data related to a specified monitored resource via the performance-monitoring functionality of the at least one agent manager. Via the performance-monitoring functionality of the at least one agent manager, the agent parses the collected performance data to a monitoring server for storage according to at least one standard data model implemented by the performance-monitoring platform. The at least one user dashboard allows users to view information related to the collected performance data. The facilitating includes configuring deployment attributes of the customized performance-monitoring application responsive to developer input. Moreover, the method includes deploying the customized performance-monitoring application on the performance-monitoring platform. The method also includes making the customized performance-monitoring application available to end users as a service.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch-screen and/or a video display. The information handling system may also include one or more buses operable to transmit communications between the various hardware components.

Figure 1:
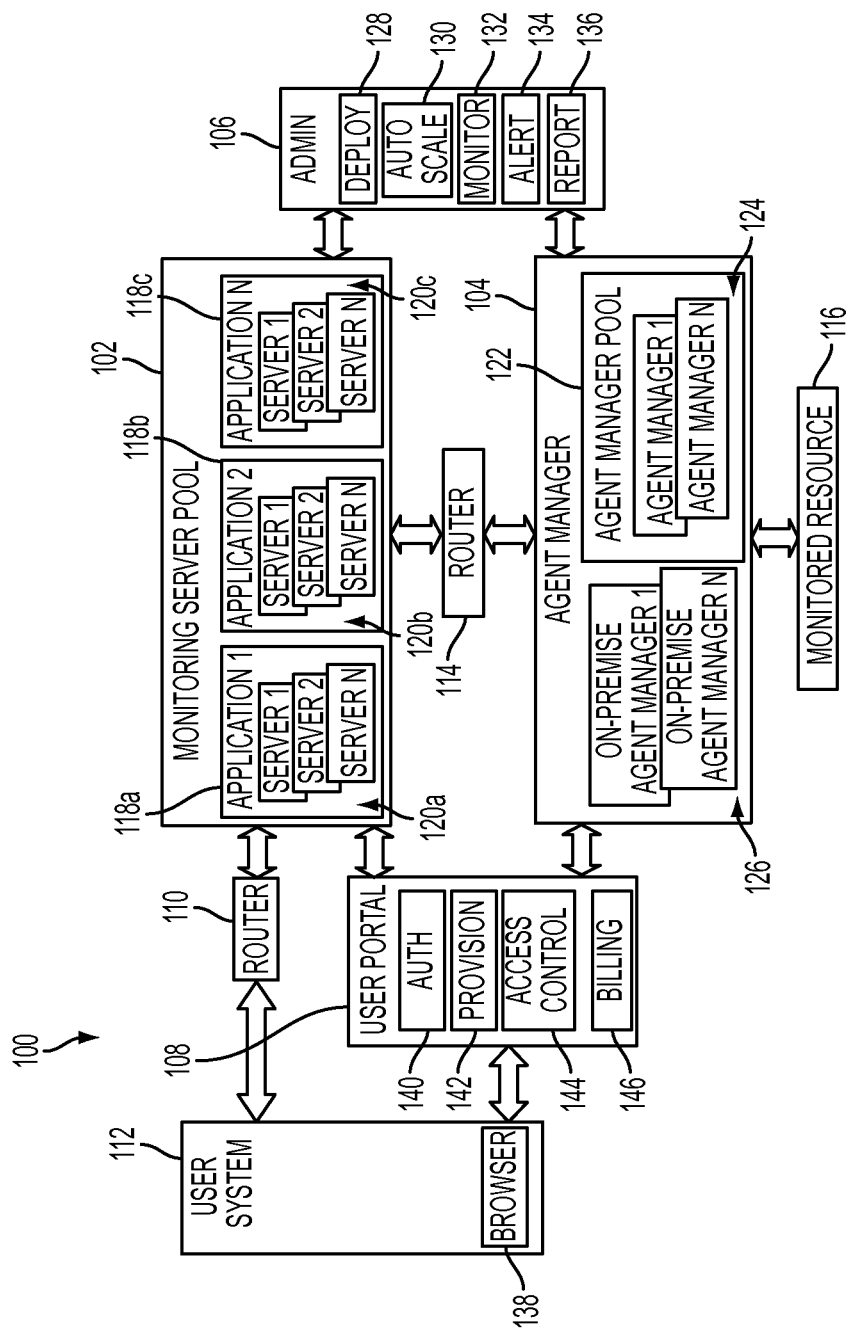
FIG. 1 illustrates a system for providing a performance-monitoring platform as a service.

FIG. 1 illustrates a system 100 for providing a performance-monitoring platform as a service. The system 100 includes a monitoring server pool 102, an agent-manager component 104, an administrative system 106, an end-user portal system 108, a router 110, an end-user system 112, and a router 114. In certain embodiments, as described in greater detail below, the system 100 enables customized performance-monitoring applications to be quickly and easily created, deployed, and used. Such customized performance-monitoring applications can be used to monitor and collect performance data from one or more monitored resources 116. The one or more resources 116 are generally a target that a given user wants to monitor such as, for example, an database server, a website uniform resource locator (URL), and/or the like.

The agent-manager component 104 includes a plurality of agent managers that each provide customizable performance-monitoring functionality via one or more interfaces such as, for example, an application programming interface (API). The agent-manager component 104 can include an on-demand agent-manager pool 122 and one or more on-premise agent managers 126. The on-demand agent-manager pool 122 can include, for example, one or more on-demand agent managers 124 that are maintained and executed on the system 100. The on-demand agent managers 124 can be used by the customized performance-monitoring applications that are deployed on the system 100. The one or more on-premise agent managers 126 can be used, for example, when a particular monitored resource of the monitored resources 116 is in a given user's local intranet or otherwise cannot be reached by the one or more on-demand agent managers 124. In general, each agent manager may be seen as a runtime container environment for agent instances within customized performance-monitoring applications.

The monitoring server pool 102 includes monitoring servers on which customized performance-monitoring applications can be deployed and executed. In that way, the monitoring server pool 102 can be used to monitor certain monitored resources such as, for example, the monitored resources 116. For illustrative purposes, customized performance-monitoring applications 118a, 118b, and 118c (collectively, customized performance-monitoring applications 118) are shown to execute on one or more monitoring servers 120a, 120b, and 120c (collectively, monitoring servers 120), respectively. In certain embodiments, the monitoring servers 120 can provide data transformation, topology, and metric-data storage functionality as described in U.S. Pat. No. 8,175,862, which patent is hereby incorporated by reference. In addition, the monitoring servers can provide a user-interface framework for enabling presentation of performance data collected from or generated with respect to the one or more monitored resources 116.

The customized performance-monitoring applications 118 typically provide ability to monitor one or more specified monitored resources. By virtue of being monitored by the customized performance-monitoring applications, such specified monitored resources may be considered to be included in the one or more monitored resources 116. For example, the customized performance-monitoring applications can monitor websites identified by a URL, a cloud computing platform and/or other infrastructure, etc. In general, the customized performance-monitoring applications 118 can include a standard data model that defines a data structure (e.g., of collected or generated performance data), agents that that collect performance data, UI components that can be used view collected or generated performance data, analytics components, and/or other components. Collected or generated performance data is typically parsed to one of the monitoring servers 120 and stored (e.g., persisted) according to the standard data model. When the customized performance-monitoring applications 118 are executed, the monitoring servers 120 can receive the collected or generated performance data, process the data, fire rules or alarms (e.g., responsive to specified criteria being met), generate derived or calculated metrics, and persist the data to storage. An example of the customized performance-monitoring applications 118 will be described with respect to FIG. 3.

In some embodiments, the agent managers of the agent-manager component 104 may only connect with one of the monitoring servers 120 at a time. In these embodiments, the router 114 can be responsible for maintaining connections between the agent managers of the agent-manager component 104 and the monitoring server pool 102. For example, the router 114 may include routing rules configured in a lookup table that maps each agent manger to a monitoring server. In a typical embodiment, the mappings can be changed dynamically. In that way, the connections between the agent managers of the agent-manager component 104 and the monitoring server pool 102 can be changed if necessary or desirable.

In various embodiments, the system 100 may interact with multiple kinds of customers in furtherance of its functionality. For example, the system 100 can support developers who desire to develop customized performance-monitoring applications such as, for example, the customized performance-monitoring applications 118. By way of further example, the system 100 can support end users who buy and use the customized performance-monitoring applications, for example, to view and analyze collected performance data for end-user-specified resources.

The administration system 106 can be an administrative portal for developers to use. In an example, developers can develop a customized performance-monitoring application offline and subsequently deploy the customized performance-monitoring application to the system 100 (e.g., the monitoring server pool 102). As shown, the administration system can include a deployment module 128, an auto-scaling module 130, a monitoring module 132, an alerts module 134, and a reporting module 136.

The deployment module 128 can include functionality to deploy customized performance-monitoring applications (e.g., the customized performance-monitoring applications 118) on monitoring servers of the monitoring server pool 102. The monitoring module 132 can monitor, for example, a runtime summary of a given developer's customized performance-monitoring application. The alerts module 134 can generate and deliver alerts to designated individuals on an application-specific basis if, for example, an exception occurs. The reports module 136 can deliver or make available administration reports related to execution of the customized performance-monitoring applications.

The auto-scaling module 130 can include scaling rules related to monitoring servers and agent managers. Regarding monitoring servers, the auto-scaling module 130 can include rules regarding when a given customized performance-monitoring application should be scaled out to additional monitoring servers. In various embodiments, customized performance-monitoring applications can be scaled according to a calculated tenant count. For example, if application A specifies that each monitoring server can support fifty application-A tenants, then the fifty-first tenant can be assigned to a new monitoring server. In an example, initially, the deployment module 128 may deploy a particular customized performance-monitoring application to only one of the monitoring servers 120 of the monitoring server pool 102. If determined necessary, the auto-scaling module 130 can cause the deployment module 128 to deploy the particular customized performance-monitoring application to additional ones of the monitoring servers 120.

Regarding agent managers, the auto-scaling module 130 can include rules related to when additional agent managers are needed. In various embodiments, particular customized performance-monitoring applications can include one or more different types of agents. An agent type can be a basis for classifying or evaluating computer-resource needs. For example, application A may have agent type A1 and agent type A2. According to this example, a corresponding agent manager from the agent-manager component 104 can be scaled by a calculated agent resource weight. Consider an example in which the corresponding agent manager can serve a resource weight of one hundred. If the agent A1 has a resource weight of ten and agent A2 has a resource weight of five, the corresponding agent manager can serve ten A1 agents, 20 A2 agents, a combination of five A1 agents and ten A2 agents, etc. When a new agent manager is needed, additional agent managers can be deployed. In that way, the one or more on-premise agent managers and/or the one or more on-demand agent managers can grow in number as required.

In various cases, some or all of the rules implemented by the auto-scaling module 130 can be customized, or defined, for example, by a developer. In certain embodiments, the rules can be scripts, for example, that acquire an application runtime summary which includes data such as user count and server performance data. Based on such data, the script can evaluate whether scaling is advisable. The rules implemented by the auto-scaling module 130 can also include default rules that do not require any developer input.

In a typical embodiment, the end-user portal system 108 can be a portal for end users to use. In various embodiments, the end-user portal system 108 can be accessed via a browser 138, or other client application, executing on the end-user system 112. As illustrated, the end-user portal system 108 can include an authentication module 140, a provision module 142, an access-control module 144, and a billing module 146. Consider an example in which a particular user would like to access the customized performance-monitoring application 118a. According to this example, the authentication module 140 can provide user-registration functionality and user-login functionality, etc. After successful registration and/or login, the provision module 142 can determine to which of the monitoring servers 120a to bind the particular end user. Thereafter, a tenant can be created on the determined monitoring server.

The access-control module 144 can control the visibility of the monitoring servers 120a so that the particular end user will be sent to the determined monitoring server. More specifically, the router 110 can maintain routing rules configured in a lookup table. The routing rules of the router 110 can map users to specific monitoring servers in the monitoring server pool 102 to which they are bound. After a user has been bound to a monitoring server as described above, subsequent requests of that user can be routed to the same monitoring server. In a typical embodiment, the mappings can be changed dynamically. For example, if a given user is migrated from one monitoring server to another, the routing rules of the router 110 can be updated.

If the customized performance-monitoring application 118a is not available free of charge, the billing module 146 can provide an interface and supporting functionality for the particular end user to purchase access to the customized performance-monitoring application 118a.

Figure 2:
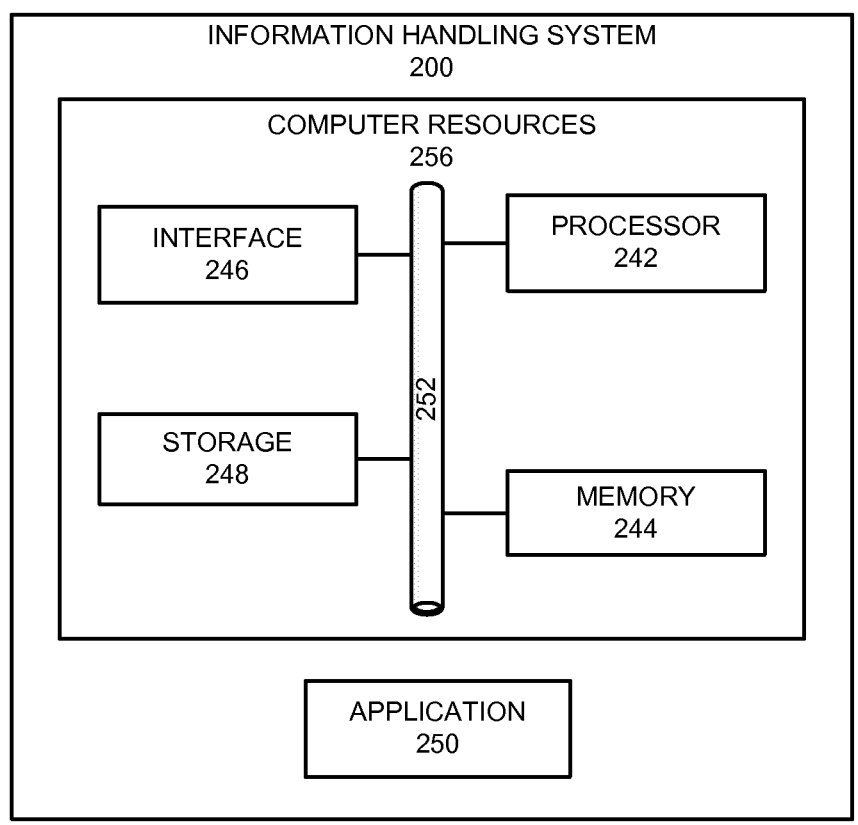
FIG. 2 illustrates an example of an information handling system.

FIG. 2 illustrates an example of an information handling system 200 that can be representative, for example, of the monitoring servers of the monitoring server pool 102, the agent-manager component 104 and its agent managers, the administrative system 106, the end-user portal system 108, the router 110, the end-user system 112, and/or the router 114 of FIG. 1. The information handling system 200 includes an application 250 operable to execute on computer resources 256. The application 250 can be similar, for example, the customized performance-monitoring applications 118 and/or software components of the system 100. In particular embodiments, the information handling system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the information handling system 200 may comprise any suitable physical form, configuration, number, type and/or layout. As an example, and not by way of limitation, the information handling system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the information handling system 200 may include one or more computer systems; be unitary or distributed; span multiple locations; span multiple machines; or reside in a cloud, which may include one or more cloud components in one or more networks.

In the depicted embodiment, the information handling system 200 includes a processor 242, memory 244, storage 248, interface 246, and bus 252. Although a particular information handling system is depicted having a particular number of particular components in a particular arrangement, this disclosure contemplates any suitable information handling system having any suitable number of any suitable components in any suitable arrangement.

Processor 242 may be a microprocessor, controller, or any other suitable computing device, resource, or combination of hardware, software and/or encoded logic operable to execute, either alone or in conjunction with other components, (e.g., memory 244), the application 250. Such functionality may include providing various features discussed herein. In particular embodiments, processor 242 may include hardware for executing instructions, such as those making up the application 250. As an example and not by way of limitation, to execute instructions, processor 242 may retrieve (or fetch) instructions from an internal register, an internal cache, memory 244, or storage 248; decode and execute them; and then write one or more results to an internal register, an internal cache, memory 244, or storage 248.

In particular embodiments, processor 242 may include one or more internal caches for data, instructions, or addresses. This disclosure contemplates processor 242 including any suitable number of any suitable internal caches, where appropriate. As an example and not by way of limitation, processor 242 may include one or more instruction caches, one or more data caches, and one or more translation lookaside buffers (TLBs). Instructions in the instruction caches may be copies of instructions in memory 244 or storage 248 and the instruction caches may speed up retrieval of those instructions by processor 242. Data in the data caches may be copies of data in memory 244 or storage 248 for instructions executing at processor 242 to operate on; the results of previous instructions executed at processor 242 for access by subsequent instructions executing at processor 242, or for writing to memory 244, or storage 248; or other suitable data. The data caches may speed up read or write operations by processor 242. The TLBs may speed up virtual-address translations for processor 242. In particular embodiments, processor 242 may include one or more internal registers for data, instructions, or addresses. Depending on the embodiment, processor 242 may include any suitable number of any suitable internal registers, where appropriate. Where appropriate, processor 242 may include one or more arithmetic logic units (ALUs); be a multi-core processor; include one or more processors 242; or any other suitable processor.

Memory 244 may be any form of volatile or non-volatile memory including, without limitation, magnetic media, optical media, random access memory (RAM), read-only memory (ROM), flash memory, removable media, or any other suitable local or remote memory component or components. In particular embodiments, memory 244 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 244 may include one or more memories 244, where appropriate. Memory 244 may store any suitable data or information utilized by the information handling system 200, including software embedded in a computer readable medium, and/or encoded logic incorporated in hardware or otherwise stored (e.g., firmware). In particular embodiments, memory 244 may include main memory for storing instructions for processor 242 to execute or data for processor 242 to operate on. In particular embodiments, one or more memory management units (MMUs) may reside between processor 242 and memory 244 and facilitate accesses to memory 244 requested by processor 242.

As an example and not by way of limitation, the information handling system 200 may load instructions from storage 248 or another source (such as, for example, another computer system) to memory 244. Processor 242 may then load the instructions from memory 244 to an internal register or internal cache. To execute the instructions, processor 242 may retrieve the instructions from the internal register or internal cache and decode them. During or after execution of the instructions, processor 242 may write one or more results (which may be intermediate or final results) to the internal register or internal cache. Processor 242 may then write one or more of those results to memory 244. In particular embodiments, processor 242 may execute only instructions in one or more internal registers or internal caches or in memory 244 (as opposed to storage 248 or elsewhere) and may operate only on data in one or more internal registers or internal caches or in memory 244 (as opposed to storage 248 or elsewhere).

In particular embodiments, storage 248 may include mass storage for data or instructions. As an example and not by way of limitation, storage 248 may include a hard disk drive (HDD), a floppy disk drive, flash memory, an optical disc, a magneto-optical disc, magnetic tape, or a Universal Serial Bus (USB) drive or a combination of two or more of these. Storage 248 may include removable or non-removable (or fixed) media, where appropriate. Storage 248 may be internal or external to the information handling system 200, where appropriate. In particular embodiments, storage 248 may be non-volatile, solid-state memory. In particular embodiments, storage 248 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 248 may take any suitable physical form and may comprise any suitable number or type of storage. Storage 248 may include one or more storage control units facilitating communication between processor 242 and storage 248, where appropriate.

In particular embodiments, interface 246 may include hardware, encoded software, or both providing one or more interfaces for communication (such as, for example, packet-based communication) among any networks, any network devices, and/or any other computer systems. As an example and not by way of limitation, communication interface 246 may include a network interface controller (NIC) or network adapter for communicating with an Ethernet or other wire-based network and/or a wireless NIC (WNIC) or wireless adapter for communicating with a wireless network.

Depending on the embodiment, interface 246 may be any type of interface suitable for any type of network for which information handling system 200 is used. As an example and not by way of limitation, information handling system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The information handling system 200 may include any suitable interface 246 for any one or more of these networks, where appropriate.

In some embodiments, interface 246 may include one or more interfaces for one or more I/O devices. One or more of these I/O devices may enable communication between a person and the information handling system 200. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 246 for them. Where appropriate, interface 246 may include one or more drivers enabling processor 242 to drive one or more of these I/O devices. Interface 246 may include one or more interfaces 246, where appropriate.

Bus 252 may include any combination of hardware, software embedded in a computer readable medium, and/or encoded logic incorporated in hardware or otherwise stored (e.g., firmware) to couple components of the information handling system 200 to each other. As an example and not by way of limitation, bus 252 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 252 may include any number, type, and/or configuration of buses 252, where appropriate. In particular embodiments, one or more buses 252 (which may each include an address bus and a data bus) may couple processor 242 to memory 244. Bus 252 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 242 (such as, for example, one or more internal registers or caches), one or more portions of memory 244, one or more portions of storage 248, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
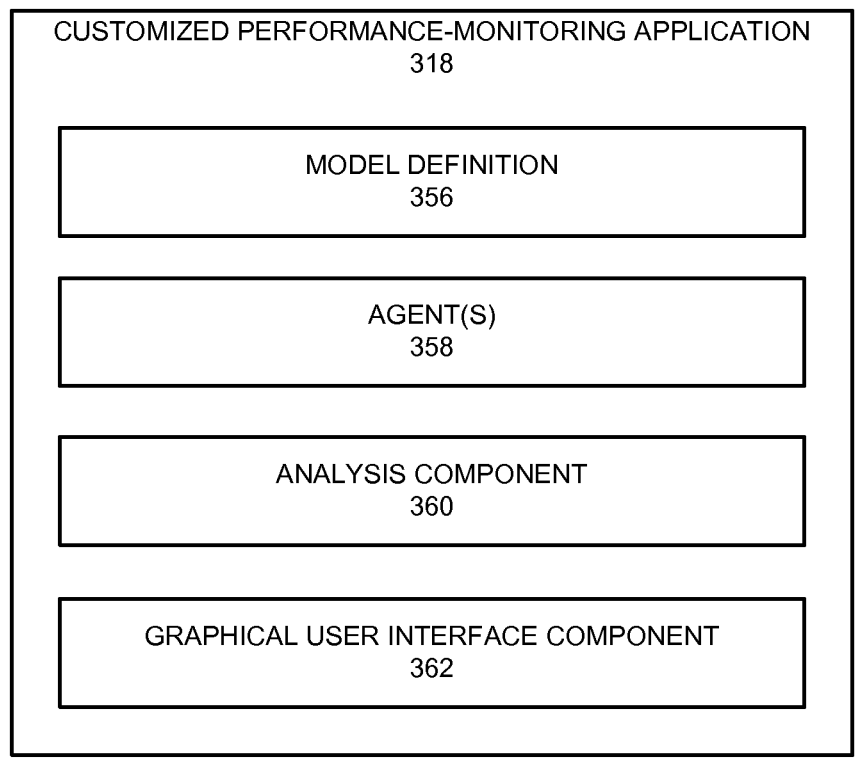
FIG. 3 illustrates an example of a customized performance-monitoring application.

FIG. 3 illustrates an example of a customized performance-monitoring application 318. In various embodiments, the customized performance-monitoring application 318 can operate as described with respect to the customized performance-monitoring applications 118 of FIG. 1. The customized performance-monitoring application 318 includes a model definition 356, one or more agents 358, an analysis component 360, and a graphical user interface (GUI) component 362.

The model definition 356 defines a standard structure of performance data that will be collected and stored. The model definition 356 can be similar to that which is described in U.S. Pat. No. 8,175,862, which patent is incorporated by reference above. The one or more agents 358 can each be a module that can collect performance data from end-user-specified monitored resources such as, for example, one of the one or more monitored resources 116 of FIG. 1. As described above, the agent 358 can run inside of a runtime container environment provided by an agent manager such as, for example, one of the agent managers of the agent-manager component 104. It should be appreciated that, in some cases, the customized performance-monitoring application 318 can include many agents of many different types. The analysis component 360 can aggregate or analyze collected performance data to create, for example, additional performance data regarding monitored resources. The GUI component 362 can provide a web interface, for example, as a single interface related to viewing performance data collected or generated by the customized performance-monitoring application 318. The single interface can include one or more user dashboards that present collected or generated performance data. In that way, the GUI component 362 can interface with administrative and end-user portals such as, for example, the administration system 106 and the end-user portal system 108, respectively, of FIG. 1.

Figure 4:
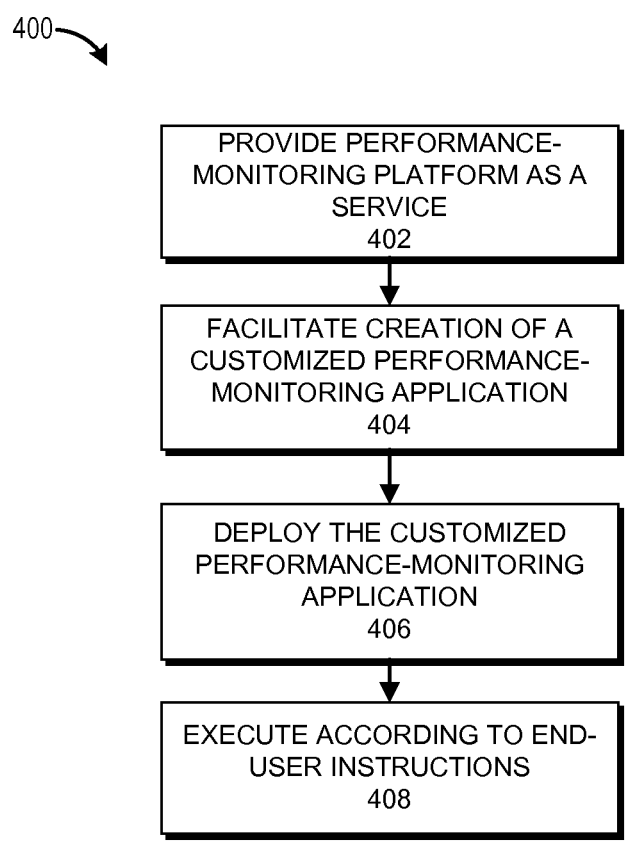
FIG. 4 illustrates an example of a process for creating a customized performance-monitoring application.

FIG. 4 presents a flowchart of an example of a process 400 for creating a customized performance-monitoring application. The process 400 can be implemented by any system that can process data and execute applications. For example, the process 400, in whole or in part, can be implemented by one or more of the monitoring server pool 102, the agent-manager component 104 (or agent managers therein), the administration system 106, the end-user portal system 108, the router 110, the end-user system 112, and/or the router 114. In some cases, the process 400 can be performed generally by the system 100. Although any number of systems, in whole or in part, can implement the process 400, to simplify discussion, the process 400 will be described in relation to the system 100 and/or subsystems thereof.

At block 402, a performance-monitoring platform is provided as a service. In certain embodiments, the performance-monitoring platform can be similar to the system 100 of FIG. 1. At block 404, the system 100 facilitates creation of a customized performance-monitoring application. For example, the block 404 can include interacting with a user such as, for example, a developer, via the administration system 106. The customized performance-monitoring application that is created can be similar to the customized performance-monitoring application 318 of FIG. 3 and/or the customized performance-monitoring applications 118 of FIG. 1. The block 404 can also include configuring deployment attributes of the customized performance-monitoring application such as, for example, auto-scaling rules, whether to employ on-premises or on a platform such as the system 100, user privileges required to view each user dashboard, a pricing strategy if the customized performance-monitoring application is not free of charge, etc.

At block 406, the customized performance-monitoring application is deployed. In various embodiments, the customized performance-monitoring application may be deployed on the system 100, on premises on a customer system, and/or the like. If the customized performance-monitoring application is deployed on the system 100, the deployment module 128 can receive a unitary deployment package (e.g., via developer upload) that includes the customized performance-monitoring application, the deployment attributes, and/or other components or attributes. In this fashion, the customized performance-monitoring application can be deployed on, and bound to, one or more monitoring servers of the monitoring server pool 102 as described above.

At block 408, the customized performance-application can execute as instructed via the end-user portal system 108. In that way, the customized performance-monitoring application can be offered as a service to end users, who in some cases can be customers of the developer or creator of the customized performance-monitoring application. For example, via the end-user portal system 108, an end user on the end-user system 112 may purchase access to the customized performance-monitoring application and specify one or more resources to be monitored. Collected or generated performance data can be published to authorized and permissioned users on a service or purchase-specific basis via, for example, the end-user portal system 108. The block 408 can also include, for example, automatically scaling when necessary as described above.

Figure 5:
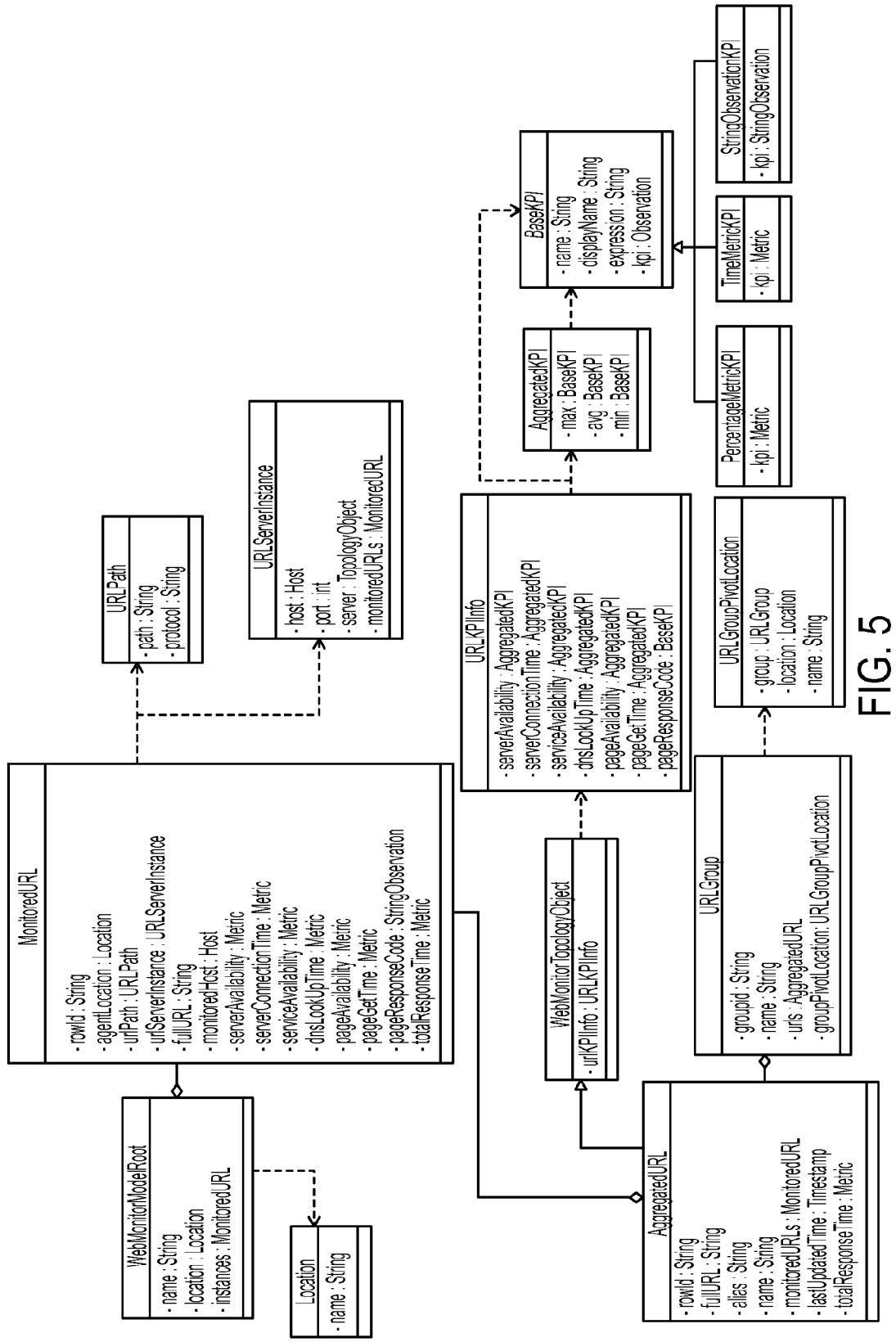
FIG. 5 illustrates example data structures.

FIG. 5 illustrates example data structures that can be used by a system such as the system 100 of FIG. 1 to represent monitored resources and performance data related thereto.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, by a computer system:
providing a performance-monitoring platform as a service, the performance-monitoring platform comprising at least one agent manager;
wherein the at least one agent manager comprises a runtime container environment for agents, the at least one agent manager providing customizable performance-monitoring functionality via at least one interface;
facilitating creation of a customized performance-monitoring application, the facilitating comprising interaction with at least one developer, the performance-monitoring application comprising an agent and at least one user dashboard;
wherein the agent is configured to collect performance data related to a specified monitored resource via the performance-monitoring functionality of the at least one agent manager;
wherein, via the performance-monitoring functionality of the at least one agent manager, the agent parses the collected performance data to a monitoring server for storage according to at least one standard data model implemented by the performance-monitoring platform;
wherein the at least one user dashboard allows users to view information related to the collected performance data;
wherein the facilitating comprises configuring deployment attributes of the customized performance-monitoring application responsive to developer input;
deploying the customized performance-monitoring application on the performance-monitoring platform; and
making the customized performance-monitoring application available to end users as a service.

2. The method of claim 1, comprising executing the customized performance-monitoring application according to instructions received via an end-user portal.

3. The method of claim 1, comprising facilitating a purchase by at least one end user of access to the customized performance-monitoring application.

4. The method of claim 1, comprising:
receiving, from at least one end user, a specification of at least one resource to monitor;
monitoring the at least resource via the customized performance-monitoring application; and
providing the at least one end user with access to performance data related to the at least one resource via the at least one user dashboard.

5. The method of claim 1, wherein the deployment attributes comprise one or more attributes related to at least one default automatic-scaling rule, at least one custom automatic-scaling rule, user privileges required to view the at least one user dashboard, and a pricing strategy related to the customized performance-monitoring application.

6. The method of claim 1, wherein the customized performance-monitoring application comprises a performance-data analysis component.

7. The method of claim 1, comprising automatically scaling the at least one agent manager based, at least in part, on a number of agents served by the at least one agent manager.

8. The method of claim 1, comprising automatically scaling the customized performance-monitoring application to one or more additional monitoring servers based, at least in part, on a tenant count on a monitoring server to which the customized performance-monitoring application is already bound.

9. An information handling system comprising:
at least one processor, wherein the processor is operable to implement a method comprising:
providing a performance-monitoring platform as a service, the performance-monitoring platform comprising at least one agent manager;
wherein the at least one agent manager comprises a runtime container environment for agents, the at least one agent manager providing customizable performance-monitoring functionality via at least one interface;
facilitating creation of a customized performance-monitoring application, the facilitating comprising interaction with at least one developer, the performance-monitoring application comprising an agent and at least one user dashboard;
wherein the agent is configured to collect performance data related to a specified monitored resource via the performance-monitoring functionality of the at least one agent manager;
wherein, via the performance-monitoring functionality of the at least one agent manager, the agent parses the collected performance data to a monitoring server for storage according to at least one standard data model implemented by the performance-monitoring platform;
wherein the at least one user dashboard allows users to view information related to the collected performance data;
wherein the facilitating comprises configuring deployment attributes of the customized performance-monitoring application responsive to developer input;
deploying the customized performance-monitoring application on the performance-monitoring platform; and
making the customized performance-monitoring application available to end users as a service.

10. The information handling system of claim 9, the method comprising executing the customized performance-monitoring application according to instructions received via an end-user portal.

11. The information handling system of claim 9, the method comprising facilitating a purchase by at least one end user of access to the customized performance-monitoring application.

12. The information handling system of claim 9, the method comprising:
receiving, from at least one end user, a specification of at least one resource to monitor;
monitoring the at least resource via the customized performance-monitoring application; and
providing the at least one end user with access to performance data related to the at least one resource via the at least one user dashboard.

13. The information handling system of claim 9, wherein the deployment attributes comprise one or more attributes related to at least one default automatic-scaling rule, at least one custom automatic-scaling rule, user privileges required to view the at least one user dashboard, and a pricing strategy related to the customized performance-monitoring application.

14. The information handling system of claim 9, wherein the customized performance-monitoring application comprises a performance-data analysis component.

15. The information handling system of claim 9, comprising automatically scaling the at least one agent manager based, at least in part, on a number of agents served by the at least one agent manager.

16. The information handling system of claim 9, the method comprising automatically scaling the customized performance-monitoring application to one or more additional monitoring servers based, at least in part, on a tenant count on a monitoring server to which the customized performance-monitoring application is already bound.

17. A computer-program product comprising a non-transitory computer-usable medium having computer-readable program code embodied therein, the computer-readable program code adapted to be executed to implement a method comprising:
providing a performance-monitoring platform as a service, the performance-monitoring platform comprising at least one agent manager;
wherein the at least one agent manager comprises a runtime container environment for agents, the at least one agent manager providing customizable performance-monitoring functionality via at least one interface;
facilitating creation of a customized performance-monitoring application, the facilitating comprising interaction with at least one developer, the performance-monitoring application comprising an agent and at least one user dashboard;
wherein the agent is configured to collect performance data related to a specified monitored resource via the performance-monitoring functionality of the at least one agent manager;
wherein, via the performance-monitoring functionality of the at least one agent manager, the agent parses the collected performance data to a monitoring server for storage according to at least one standard data model implemented by the performance-monitoring platform;
wherein the at least one user dashboard allows users to view information related to the collected performance data;
wherein the facilitating comprises configuring deployment attributes of the customized performance-monitoring application responsive to developer input;
deploying the customized performance-monitoring application on the performance-monitoring platform; and
making the customized performance-monitoring application available to end users as a service.

18. The computer-program product of claim 17, the method comprising executing the customized performance-monitoring application according to instructions received via an end-user portal.

19. The computer-program product of claim 17, the method comprising facilitating a purchase by at least one end user of access to the customized performance-monitoring application.

20. The computer-program product of claim 17, the method comprising:
receiving, from at least one end user, a specification of at least one resource to monitor;
monitoring the at least resource via the customized performance-monitoring application; and providing the at least one end user with access to performance data related to the at least one resource via the at least one user dashboard.

\* \* \* \* \*